United States Patent [19]

Chandler et al.

[11] Patent Number: 5,637,638
[45] Date of Patent: Jun. 10, 1997

[54] ERASABLE INK COMPOSITION CONTAINING A WATERBORNE POLYURETHANE-UREA DERIVED FROM AN AROMATIC AMINE DYE MONOMER AND MARKING INSTRUMENT CONTAINING SAME

[75] Inventors: Wayne A. Chandler, Mauldin; David C. Villiger, Greenville, both of S.C.; Jeffery H. Banning, Hillsboro, Oreg.; Barry Chadwick; Aiying Wang, both of Simpsonville, S.C.

[73] Assignee: BIC Corporation, Milford, Conn.

[21] Appl. No.: 518,671

[22] Filed: Aug. 24, 1995

[51] Int. Cl.$^6$ .................. C08J 3/00; C08K 3/20; C08L 75/00; C03C 17/00

[52] U.S. Cl. .................. 524/591; 523/160; 523/161; 524/539; 106/31.32; 106/31.44; 106/31.43; 401/40

[58] Field of Search .................. 523/160, 161; 524/591, 539; 106/19 R, 20 R, 21 D, 23 B, 19 A; 401/40

[56] References Cited

U.S. PATENT DOCUMENTS

| | | | |
|---|---|---|---|
| 3,970,601 | 7/1976 | Weber et al. | 8/178 E |
| 3,993,619 | 11/1976 | Kruckenberg et al. | 260/205 |
| 4,284,729 | 8/1981 | Cross et al. | 521/158 |
| 4,617,373 | 10/1986 | Pruett et al. | 528/288 |
| 4,750,935 | 6/1988 | Prochaska et al. | 106/20 |
| 4,757,130 | 7/1988 | DeMartino | 528/288 |
| 4,778,742 | 10/1988 | Ong et al. | 430/106 |
| 5,194,463 | 3/1993 | Krutak et al. | 524/35 |
| 5,217,255 | 6/1983 | Lin et al. | 281/15.1 |
| 5,231,135 | 7/1993 | Machell et al. | 525/123 |
| 5,401,612 | 3/1995 | Etzbach et al. | 430/285 |

FOREIGN PATENT DOCUMENTS 322805  7/1989  European Pat. Off. .

OTHER PUBLICATIONS

Frisch et al., "Advances in Urethane Science and Technology", vol. 10, pp. 121–162 (1987).

*Primary Examiner*—Patrick Niland
*Attorney, Agent, or Firm*—Dilworth & Barrese

[57] ABSTRACT

An erasable ink composition comprising a waterborne polyurethane-urea containing dye moiety covalently bonded thereto. The ink is intended for use in any of a variety of marking instruments, in particular, a ball-point pen.

17 Claims, No Drawings

ERASABLE INK COMPOSITION CONTAINING A WATERBORNE POLYURETHANE-UREA DERIVED FROM AN AROMATIC AMINE DYE MONOMER AND MARKING INSTRUMENT CONTAINING SAME

BACKGROUND OF THE INVENTION

This invention relates to an erasable ink composition and to a marking instrument, e.g., a ball-point pen, containing the composition. More particularly, this invention relates to an erasable ink composition containing a waterborne polyurethane-urea component derived from an aromatic amine dye monomer and possessing a dye moiety covalently bonded thereto.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,479, 5,120,359, 5,160,369 and 5,217,255. These inks are formulated by mixing a dye (taken herein to also include "pigment", "colorant", "chromophore" and other terms of similar meaning) with a variety of polymer and liquid carrier/solvent combinations thereby forming a flowable dye/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual dye which remains after erasure. Incomplete erasure may be attributed to inadequate removal of the dye/polymer matrix from the paper substrate and/or migration of dye into the pores of the substrate.

SUMMARY OF THE INVENTION

In accordance with the present invention an erasable ink composition is provided which comprises a waterborne polyurethane-urea in which the polyurethane urea includes structural units of the general formula:

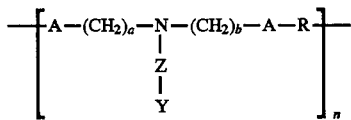

wherein each A independently can be an ester or amide linkage, n can be an integer of from about 1 to about 50, R is an aliphatic or aromatic hydrocarbon with up to about 30 carbon atoms, a and b are independently from 1 to about 10, Z is a substituted or unsubstituted arylene group or a single bond when Y is an anthraquinone group and Y is selected from the group consisting of an azo, tricyanovinyl, anthraquinone and methine group.

Since the dye is covalently bonded to the waterborne polyurethane-urea component of the erasable ink composition herein, there is little opportunity for the dye to separate from the waterborne polyurethane-urea and migrate into a porous substrate. The erasable ink composition of this invention is apt to leave significantly less residual dye following its erasure than known erasable ink compositions in which the dye is merely physically combined with the polymer component(s).

DESCRIPTION OF THE PREFERRED EMBODIMENTS

The polyurethane-urea employed herein is one prepared by a waterborne process, i.e., a polymerization process in which the resulting polymer is provided as an aqueous emulsion or dispersion of polyurethane-urea particles. The polyurethane-urea emulsion with or without the addition of other components can, if desired, be utilized directly as the erasable ink composition of this invention thus eliminating any further manufacturing operations (unlike the case of bulk polymer dyes which would require pulverization to the desired particle size followed by addition of some suitable evaporable liquid carrier).

The waterborne polyurethane-urea utilized herein is prepared by modification of any of the polymerization processes described in Frisch et al., ed., "Advances in Urethane Science and Technology", Vol. 10, pp. 121–162 (1987), the contents of which are incorporated by reference herein. The modification referred to involves the substitution of part or all of one or more of the reactants employed in these processes with a dye monomer possessing covalently bonded dye in accordance with the present invention.

The dye monomers utilized in the practice of this invention possess pendent dye moieties covalently bonded thereto. The dye moieties can be of any variety such as azo, tricyanovinyl, anthraquinone and methine. Azo dye moieties are generally preferred. The dye monomers include structural units of the general formula:

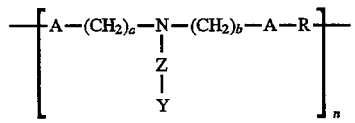

wherein each A independently can be an ester or amide linkage, n can be an integer of from about 1 to about 50, preferably from about 1 to about 5, R is an aliphatic (straight-chain, branched or cyclic) or aromatic (single or fused ring) hydrocarbon with up to about 30 carbon atoms, a and b are independently from 1 to about 10, Z is an arylene group such as phenylene, diphenylene or naphthylene, optionally containing one or more substituents such as halogen, hydroxyl, —CHO, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is a dye moiety selected from (1) an azo group where Y can be —N=N—D or —N=N—G—N=N—D wherein D is an aromatic nucleus of 1 to 5 rings (fused or connected by single bonds) or a heterocyclic ring of 4, 5 or 6 members containing one to four or more atoms of —N—, —S— and nonperoxidic atoms —O— and optionally bearing one or more auxochromic groups such as —Cl, —Br, —F, —OH, alkyl, alkoxy, alkylamino, dialkylamino, —NH$_2$, —NO$_2$, phenyl, carbamyl, —CN, carbalkoxy, sulfonyl, sulfamyl and sulfamido and G is a phenylene or naphthylene group; (2) a tricyanovinyl group where Y can be

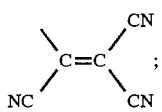

(3) an anthraquinone group where Y can be

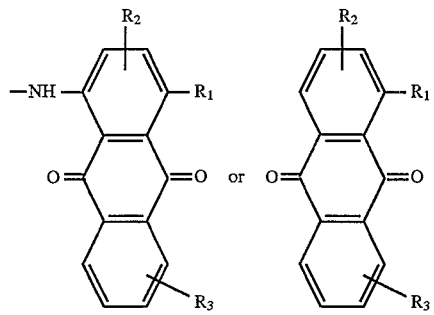

wherein $R_1$ can be —OH, —$NH_2$, alkylamine, dialkylamino or arylamino where aryl is phenyl or phenyl substituted by auxochromic groups as defined for use on D as defined in (1) above, $R_2$ and $R_3$ independently can be auxochromic groups as defined for use on D as defined in (1) above; and (4) a methine group where Y can be

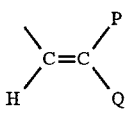

wherein P and Q are independently selected from cyano, carbalkoxy, carbaryloxy, carbaralkyloxy, carbamyl, carboxy, N-alkylcarbamyl, N-alkyl-N-arylcarbamyl, N,N-diakylcarbamyl, N-arylcarbamyl, N-cyclohexylcarbamyl, aryl, 2-benzoxazolyl, 2-benzothiazoyl, 2-benzimidazolyl, 1,3,4-thiadiazol-2-yl, 1,3,4-oxadiazol-2-yl, $SO_2$ alkyl, $SO_2$ aryl and acyl or P and Q may be combined as

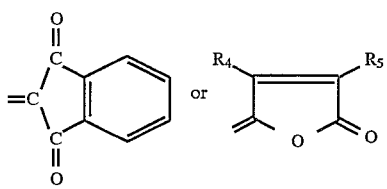

wherein $R_4$ is alkyl, aryl or cycloalkyl and $R_5$ is CN, COOH, $CO_2$ alkyl, carbamyl or N-alkylcarbamyl, wherein each alkyl, aryl or cycloalkyl moiety or portion of a group or radical may be substituted with one or more auxochromic groups as defined for use on D as defined in (1) above.

The dye monomer is advantageously produced by reacting an aromatic amine of the general formula:

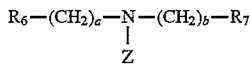

wherein $R_6$ and $R_7$ are independently COOH, $COOR_8$ wherein $R_8$ is an alkyl group of from 1 to about 8 carbon atoms, $NH_2$ and OH, a and b independently range from 1 to about 10 and Z is an aryl group such as phenyl, diphenyl, naphthyl, said aryl group optionally containing one or more substituents such as halogen, hydroxyl, —CHO, alkyl, alkoxy, alkylamino, dialkylamino, amide, alkylamide, —$NH_2$, —$NO_2$, phenyl, carbamyl, —CN, carbalkoxy, sulfonyl, sulfamyl and sulfamido with one or more reactants selected from the group consisting of polyhydric alcohol, polyamine and polycarboxylic acid under condensation polymerization reaction conditions to provide a polyester or polyamide containing polymerized units of the above-identified aromatic amine and groups that are reactive with isocyanate groups. Thereafter, a dye moiety is coupled to the polyester or polyamide through the pendant aromatic units derived from the aromatic amine employing any suitable technique such as diazotization. In an alternative embodiment, the dye moiety is coupled to the pendant aromatic units of the aromatic amine prior to forming the polyester or polyamide.

Suitable polyhydric alcohols include those of the general formula:

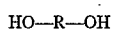

wherein R can be an aliphatic (straight-chain, branched or cyclic) or aromatic (single or fused ring) hydrocarbon with up to 30 carbon atoms, suitable polyamines include those of the general formula $H_2N$—R—$NH_2$ wherein R is the same as defined above for the polyhydric alcohol and suitable polycarboxylic acids include those of the general formula:

wherein R is the same as defined above for the polyhydric alcohol and L is halogen, hydroxyl or alkoxy. In a preferred embodiment, phenyldiethanolamine, i.e.,

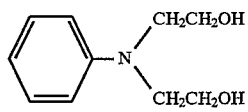

is employed as the aromatic amine, an alkanediol such as butanediol or hexanediol is employed as the polyhydric alcohol and adipic acid is employed as the polycarboxylic acid to provide a polyester polyol dye monomer in accordance with this disclosure. In another preferred embodiment, substituted phenyldiethanolamine is employed as the aromatic amine. Particularly preferred substituted phenyldiethanolamines are those corresponding to the following formulas:

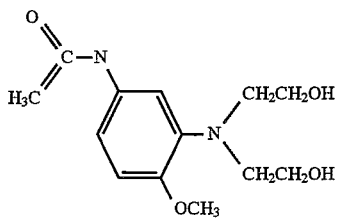

which is commercially available from Henkel Corp. (Emery 5752) and

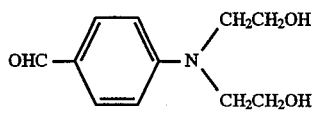

which can be obtained by, e.g., nucleophilic aromatic substitution or the Vilsmeier-Haack reaction. See, e.g., U.S. Pat. No. 4,757,130. The former substituted phenyldiethanolamine is useful as an intermediate for blue colorants. It will be understood by those skilled in the art that a molar excess of polyhydric alcohol starting reactants can be employed to provide hydroxyl-terminated polyester dye monomer and that a molar excess of polyamine starting reactants can be employed to provide amine-terminated polyamide dye monomer.

The dye monomers are preferably linear and preferably contain from 1 to about 5 dye moieties per chain length of dye monomer, more preferably 1 or 2 dye moieties per chain length. Molecular weights ranging from about 500 up to about 5000, preferably from about 2500 to about 3500, g/mol have been found to be particularly useful in the practice of this invention. The dye monomer is reacted under waterborne polymer-forming reaction conditions as disclosed herein with an isocyanate-group containing monomer to provide waterborne polyurethane-urea. It will be understood by those skilled in the art that uncolored monomers, for example, uncolored polyester polyol, can be combined with the dye monomer and isocyanate-group containing monomer to provide the waterborne polyurethane-urea polymer dye disclosed herein. Any suitable uncolored monomer may be employed. Any suitable isocyanate-group containing monomer can likewise be employed. Typically, such a monomer will correspond to the general formula:

OCN—R—NCO wherein R is the same as defined above in connection with the polyhydric alcohol. Representative examples of such isocyanate-group containing monomers are the isomers of aromatic diisocyanates such as toluene diisocyanate (TDI), xylene diisocyanate, 1,3-bis(1-isocyanato-1-methylethyl) benzene and the like, difunctional aliphatic or cycloaliphatic isocyanates having between 2 and 18 carbon atoms, preferably between 4 and 12 carbon atoms, such as isopherone diisocyanate and hexamethylene diisocyanate, and isomers and oligomers of di(4-isocyanatophenyl) methane (MDI). The dye monomer and isocyanate-group containing monomer are reacted under waterborne polymer-forming reaction conditions in a hydroxyl (or amine) to isocyanate equivalent ratio of about 0.25:1 to about 1:0.25, respectively. Where an excess of isocyanate is employed, the resulting polymer can be chain extended in accordance with well known procedures. These waterborne polymer-forming reaction conditions, respectively, the solvent, melt dispersion, prepolymer mixing and ketamine/ketazine processes, can be summarized as follows:

1. The Solvent Process

The solvent process involves the steps of:

a) reacting a dye monomer possessing structural units of the general formula:

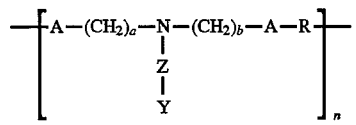

as defined above with a diisocyanate to provide an isocyanate group-terminated prepolymer possessing or lacking sufficient hydrophilic groups to render the prepolymer self-dispersible;

b) reacting the isocyanate group-terminated prepolymer dissolved in organic solvent with an aliphatic diamine chain extender and, where the prepolymer lacks sufficient hydrophilic groups to be self-dispersible, an aliphatic diamine chain extender possessing at least one hydrophilic group, to provide an organic solvent solution of self-dispersible polyurethane-urea; and, c) adding a sufficient amount of water to the organic solvent solution of the polyurethane-urea to form a dispersion of polyurethane-urea particles.

2. The Melt Dispersion Process

The melt dispersion process involves the steps of:

a) reacting a dye monomer possessing structural units of the general formula:

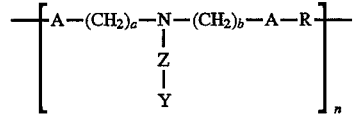

as defined above an aliphatic diol possessing at least one ionic group and a diisocyanate to provide an isocyanate group terminated prepolymer possessing ionic groups;

b) reacting the isocyanate group-terminated prepolymer with a formaldehyde-reactive capping agent to cap the isocyanate end groups;

c) dispersing the capped prepolymer in water; and, d) reacting the dispersed capped prepolymer with formaldehyde to provide dispersed polyurethane-urea particles.

3. The Prepolymer Mixing Process

The prepolymer mixing process involves the steps of:

a) reacting a dye monomer possessing structural units of the general formula:

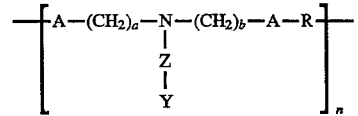

as defined above, a carboxylic group-containing diol and an aliphatic diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible;

c) dispersing the self-dispersible prepolymer in water; and, d) reacting the dispersed prepolymer with a diamine chain extender to provide an aqueous dispersion of polyurethane-urea particles.

4. The Ketamine/Ketazine Process

The ketamine/Ketazine process involves the steps of:

a) reacting a dye monomer possessing structural units of the general formula:

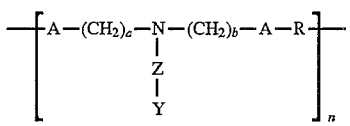

as defined above, a carboxylic group-containing diol and a diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible;

c) reacting the self-dispersible prepolymer with at least one member of the group consisting of ketimine and ketazine in the presence of water to provide an aqueous dispersion of polyurethane-urea particles.

The waterborne polyurethane-urea component of the erasable ink composition of this invention will generally possess an average particle size of from about 0.01 to about 4 microns and preferably from about 0.05 to about 0.20 microns.

The fully formulated erasable ink composition, i.e., the waterborne polyurethane-urea component in admixture with any optional component(s), can possess a relatively low viscosity, e.g., from about 2 to about 80,000 centipoises and preferably from about 3 to about 30,000 centipoises when water is the carrier, or a relatively high viscosity, e.g., at least about 100,000 centipoises and preferably at least about 500,000 centipoises when the carrier includes organic solvent or mixture of organic solvents which swell or dissolve the waterborne polyurethane-urea particles. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, organic solvents, suspension agents, humectants, emulsifiers, surfactants, plasticizers, spreading agents, drying agents, release agents, parting agents, preservatives, antimicrobial agents, anticorrosion agents, antioxidants, coalescing aids, and the like.

With or without the addition of any optional component (s), the erasable ink composition when applied to a substrate, and particularly a porous substrate such as a cellulosic paper, and upon drying thereon is (1) sufficiently adherent to the substrate as to resist flaking therefrom, (2) substantially erasable and (3) substantially non-smearing.

The erasable ink composition of this invention is intended to be used in any of a variety of marking instruments and in particular, a ball-point pen.

The following examples are illustrative of the erasable ink composition of this invention.

EXAMPLES ILLUSTRATING THE PREPARATION OF POLYESTER POLYOL DYE MONOMER

Polyester polyols obtained by reacting adipic acid, hexanediol and phenyldiethanolamine were obtained from Ruco (Hicksville, N.Y.).

These polyester polyols are identified in Table 1 below:

TABLE 1

| Polyester Polyol | Monomer Ratio (Adipic acid:phenyl diethanolamine:hexanediol) | Hydroxyl Number | Average Molecular Weight |
| --- | --- | --- | --- |
| A | 13:1:13 | 44.2 | 2539 |
| B | 13:1:13 | 33.3 | 3369 |
| C | 13:2:12 | 35.1 | 3197 |

A polyester polyol dye monomer (hereinafter "DM1") derived from polyester polyol A was formed as follows:

To a three neck round bottom flask equipped with a mechanical stirrer and addition funnel was added 45 g of 85% $H_3PO_4$. The reaction flask was cooled to $-5°$ C. and 26.3 g (0.083 moles) of 40% nitrosylsulfuric acid was added dropwise to the reaction flask while maintaining a temperature between $-5°$ and $0°$ C. with stirring. A slurry of 11.2 g (0.069 moles) 2-amino-4-methyl-3,5-dicyanothiophene and approximately 20 g 85% $H_3PO_4$ was added dropwise to the reaction flask via the addition funnel over a period of 30 minutes and allowed to stir at $0°$ C. for 1.5 hours to provide a diazonium salt solution.

After 1.5 hours, the presence of excess nitration species was determined qualitatively utilizing starch/iodide paper and any excess nitration species was removed by adding to the mixture a water solution of urea or sulfamic acid.

The diazonium salt solution was transferred via cannula to a solution of acetonitrile (400 ml) and 182.7 g (0.072 moles) of polyester polyol A at $0°$ C. with stirring. The reaction mixture was allowed to come to room temperature and stirred for 2 hours. The reaction mixture was neutralized using caustic. The solvent was removed under vacuum and a reddish-violet solid was obtained. This polyester polyol dye monomer was washed free of salts and other soluble materials with hot water.

A polyester polyol dye monomer (hereinafter "DM2") derived from polyester polyol B was formed as follows:

To a three neck round bottom flask equipped with a mechanical stirrer and addition funnel was added 45 g of 85% $H_3PO_4$. The reaction flask was cooled to $-5°$ C. and 15.51 g (0.049 moles) of 40% nitrosylsulfuric acid was added dropwise to the reaction flask while maintaining a temperature between $-5°$ and $0°$ C. with stirring. A slurry of 6.88 g (0.042 moles) 2-amino-4-methyl-3,5-dicyanothiophene and approximately 20 g 85% $H_3PO_4$ was added dropwise to the reaction flask via the addition funnel over a period of 30 minutes and allowed to stir at $0°$ C. for 1.5 hours to provide a diazonium salt solution.

After 1.5 hours, the presence of excess nitration species was determined qualitatively utilizing starch/iodide paper and any excess nitration species was removed by adding to the mixture a water solution of urea or sulfamic acid.

The diazonium salt solution was transferred via cannula to a solution of acetonitrile (400 ml) and 500 g (0.148 moles) of polyester polyol B at $0°$ C. with stirring. The reaction mixture was allowed to come to room temperature and stirred for 2 hours. The reaction mixture was neutralized using caustic. The solvent was removed under vacuum and a reddish-violet solid was obtained. This polyester polyol dye monomer was washed free of salts and other soluble materials with hot water.

A polyester polyol dye monomer (hereinafter "DM3") derived from polyester polyol C was formed as follows:

To a three neck round bottom flask equipped with a mechanical stirrer and addition funnel was added 45 g of 85% $H_3PO_4$. The reaction flask was cooled to −5° C. and 21.30 g (0.067 moles) of 40% nitrosylsulfuric acid was added dropwise to the reaction flask while maintaining a temperature between −5° and 0° C. with stirring. A slurry of 11.16 g (0.061 moles) 2,4-dinitroaniline and 30 g of 85% $H_3PO_4$ was added dropwise to the reaction flask via the addition funnel over a period of 30 minutes and allowed to stir at 0° C. for 2 hours to provide a diazonium salt solution.

After 2 hours, the presence of excess nitration species was determined qualitatively utilizing starch/iodide paper and any excess nitration species was removed by adding to the mixture a water solution of urea or sulfamic acid.

The diazonium salt solution was transferred via cannula to a water (500 ml) slurry of 300 g (0.093 moles) of finely ground polyester polyol C at 0° C. with stirring. The reaction mixture was allowed to come to room temperature and stirred for 2 hours. The reaction slurry was neutralized using caustic. A red solid was obtained. This polyester polyol dye monomer was collected via filtration and washed several times with hot water to remove salts and other water soluble material.

A polyester polyol dye monomer (hereinafter "DM4") derived from polyester polyol C was formed as follows:

To a three neck round bottom flask equipped with a mechanical stirrer and addition funnel was added 45 g of 85% $H_3PO_4$. The reaction flask was cooled to −5° C. and 54.62 g (0.1721 moles) of 40% nitrosylsulfuric acid was added dropwise to the reaction flask while maintaining a temperature between −5° and 0° C. with stirring. A slurry of 28.86 g (0.156 moles) 2-amino-4-chlorobenzothiazole and 30 g of 85% $H_3PO_4$ was added dropwise to the reaction flask via the addition funnel over a period of 30 minutes and allowed to stir at 0° C. for 2 hours to provide a diazonium salt solution.

After 2 hours, the presence of excess nitration species was determined qualitatively utilizing starch/iodide paper and any excess nitration species was removed by adding to the mixture a water solution of urea or sulfamic acid.

The diazonium salt solution was transferred via cannula to water (500 ml) slurry of 500 g (0.1564 moles) of finely ground polyester polyol C at 0° C. with stirring. The reaction mixture was allowed to come to room temperature and stirred for 2 hours. The reaction slurry was neutralized using caustic. A red solid was obtained. This polyester polyol dye monomer was collected via filtration and washed several times with hot water to remove salts and other water soluble material.

A polyester polyol dye monomer (hereinafter "DM5") derived from polyester polyol C was formed as follows:

To a three neck round bottom flask equipped with a mechanical stirrer and addition funnel was added 45 g of 85% $H_3PO_4$. The reaction flask was cooled to −5° C. and 38.2 g (0.12 moles) of 40% nitrosylsulfuric acid was added dropwise to the reaction flask while maintaining a temperature between −5° and 0° C. with stirring. A slurry of 28.55 g (0.109 moles) 2-bromo-4,6-dinitroaniline and 30 g of 85% $H_3PO_4$ was added dropwise to the reaction flask via the addition funnel over a period of 30 minutes and allowed to stir at 0° C. for 2 hours to provide a diazonium salt solution.

After 2 hours, the presence of excess nitration species was determined qualitatively utilizing starch/iodide paper and any excess nitration species was removed by adding to the mixture a water solution of urea or sulfamic acid.

The diazonium salt solution was transferred via cannula to a water (500 ml) slurry of 500 g (0.156 moles) of finely ground polyester polyol C at 0° C. with stirring. The reaction mixture was allowed to come to room temperature and stirred for 2 hours. The reaction slurry was neutralized using caustic. A red solid was obtained. This polyester polyol dye monomer was collected via filtration and washed several times with hot water to remove salts and other water soluble material.

Waterborne polyurethane-urea dispersions were obtained from polyester polyol dye monomers DM1, DM2, DM3, DM4 and DM5, employing the pre-polymer mixing process, as follows:

EXAMPLE 1

To a 2000 mL resin kettle equipped with an addition funnel, nitrogen inlet and mechanical stirrer was added DM5 (205.58 g), dimethylolpropionic acid (DMPA) (8.99 g) (dissolved in 20 g N-methyl pyrollidone) and dibutyltindilaurate (Fastcat 4202) catalyst (0.38 g). The reaction mixture was heated to 60°–70° C. with stirring and isopherone diisocyanate (IPDI) (42.4 g) was added over a period of 20–30 minutes to form a red colored isocyanate group-terminated prepolymer possessing free carboxyl groups. The prepolymer was stirred for 3–5 hours at temperature and the % NCO was monitored. When the theoretical % NCO was reached, triethylamine (5.91 g) was added to the colored prepolymer and allowed to stir at temperature for 30 minutes. The self-dispersible prepolymer was dispersed in a sufficient amount of water using an impeller-type dispersion blade to provide a 35–50% solids dispersion. The dispersed prepolymer was then allowed to chain extend with water at 40° C. to provide a red dispersion of polyurethane-urea particles possessing an average particle size of less than about 0.1 micron.

The above-described process was repeated to form Examples 2–8 as summarized in Table 2 as follows:

TABLE 2

| Example | Polyester polyol dye monomer/ amount (g) | Isocyanate/ amount (g) | DMPA (g) | Triethylamine (g) | Color |
|---|---|---|---|---|---|
| 2 | DM1/ 167.43 | m-TMXDI*/ 42.0 | 7.61 | 5.74 | Violet |
| 3 | DM1/ 194.79 | m-TMXDI/ 42.0 | 8.60 | 6.48 | Violet |
| 4 | DM2/ 82.44 | m-TMXDI/ 42.0 | 8.25 | 6.21 | Violet |
| 5 | DM3/ 228.36 | IPDI/ 42.4 | 8.37 | 6.95 | Red |
| 6 | DM4/ 205.58 | IPDI/ 42.4 | 8.59 | 6.78 | Red |
| 7 | DM4/ 129.71 | IPDI/ 42.4 | 15.65 | 5.89 | Red |
| 8 | DM5/ 249.86 | IPDI/ 42.4 | 10.60 | 7.99 | Red |

*m-TMXDI = 1,3-bis(1-isocyanato-1-methylethyl)-benzene

The waterborne polyurethane-urea polymer dyes utilized in the erasable ink composition herein are less expensive to fabricate, possess superior oxidative stability and superior thermal stability compared to polyurethane-urea polymer dyes fabricated from colored polyether polyols such as the polyether polyols described in U.S. Pat. No. 5,231,135. Furthermore, the polyurethane-urea dispersions fabricated from the polyester polyol dye monomers disclosed herein possess superior properties, e.g., water-fastness, compared to polyurethane-urea dispersions fabricated from the colored polyether polyols disclosed in U.S. Pat. No. 5,231,135.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which comprises a waterborne polyurethane-urea possessing a sufficient number of ionic groups in its structure as to be water dispersible, the polyurethane-urea including structural units of the general formula:

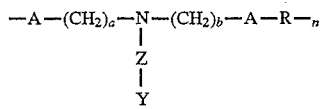

wherein each A independently can be an ester or amide linkage, n can be an integer of from about 1 to about 50, R is an aliphatic or aromatic hydrocarbon with up to about 30 carbon atoms, a and b are independently from 1 to about 10, Z is an unsubstituted arylene group, an arylene group substituted with one or more substituents selected from the group consisting of halogen, hydroxyl, —CHO, alkyl, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is selected from the group consisting of an azo, tricyanovinyl, anthraquinone and methine group.

2. The erasable ink composition of claim 1 wherein Y is an azo group of the formula —N=N—D or —N=N—G—N=N—D wherein D is an aromatic nucleus of 1 to 5 rings (fused or connected by single bonds) or a heterocyclic ring of 4, 5 or 6 members containing one to four or more atoms of —N—, —S— and nonperoxidic atoms —O— and optionally bearing one or more auxochromic groups selected from the group consisting of —Cl, —Br, —F, —OH, alkyl, alkoxy, alkylamino, dialkylamino, —NH$_2$, —NO$_2$, phenyl, carbamoyl, —CN, carbalkoxy, sulfonyl, sulfamyl and sulfamido and G is a phenylene or napthylene group.

3. The erasable ink composition of claim 1 wherein Y is a tricyanovinyl group of the formula:

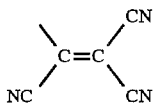

4. The erasable ink composition of claim 1 wherein Y is a monovalent anthraquinone group of the formula:

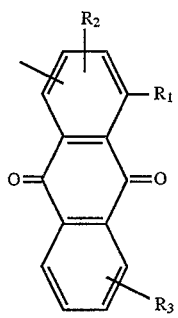

wherein R$^1$, R$_2$ and R$^3$ each independently can be —OH, —NH$_2$, alkylamine, dialkylamino or arylamino where aryl is phenyl or phenyl substituted by auxochromic groups selected from the group consisting of —Cl, —Br, —F, —OH, alkyl, alkoxy, alkylamino, dialkylamino, —NH$_2$, —NO$_2$, phenyl, carbamoyl, —CN, carbalkoxy, sulfonyl, sulfamyl and sulfamido and G is a phenylene or napthylene group.

5. The erasable ink composition of claim 1 wherein Y is a methine group of the formula:

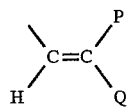

wherein P and Q are independently selected from cyano, carbalkoxy, carbaryloxy, carbaralkyloxy, carbamyl, carboxy, N-alkylcarbamyl, N-alkyl-N-arylcarbamyl, N,N-diakylcarbamyl, N-arylcarbamyl, N-cyclohexylcarbamyl, aryl, 2-benzoxazolyl, 2-benzothiazoyl, 2-benzimidazolyl, 1,3,4-thiadiazol-2-yl, 1,3,4-oxadiazol-2-yl, SO$_2$ alkyl, SO$_2$ aryl and acyl or P and Q in =CPQ may be combined as

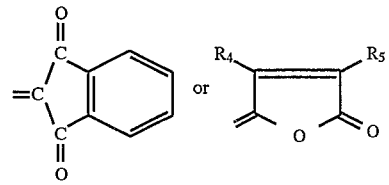

wherein R$_4$ is alkyl, aryl or cycloalkyl and R$_5$ is CN, COOH, CO$_2$ alkyl, carbamyl or N-alkylcarbamyl, wherein each alkyl, aryl or cycloalkyl moiety or portion of a group or radical may be substituted with one or more auxochromic groups selected from the group consisting of —Cl, —Br, —F, —OH, alkyl, alkoxy, alkylamino, dialkylamino, —NH$_2$, —NO$_2$, phenyl, carbamoyl, —CN, carbalkoxy, sulfonyl, sulfamyl and sulfamido.

6. The erasable ink composition of claim 1 wherein the polyurethane-urea is linear and n is from 1 to about 5.

7. The erasable ink composition of claim 1 wherein the waterborne polyurethane-urea is obtained by the solvent process which comprises:

a) reacting a dye monomer which includes structural units of the general formula:

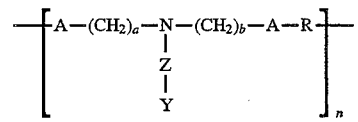

wherein each A independently can be an ester or amide linkage, n can be an integer of from about 1 to about 50, R is an aliphatic or aromatic hydrocarbon with up to about 30 carbon atoms, a and b are independently from 1 to about 10, Z is an unsubstituted arylene group, an arylene group substituted with one or more substituents selected from the group consisting of halogen, hydroxyl, —CHO, alkyl, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is selected from the group consisting of an azo, tricyanovinyl, anthraquinone and methine group with a diisocyanate to provide an isocyanate group-terminated prepolymer possessing or lacking sufficient hydrophilic groups to render the prepolymer self-dispersible;

b) reacting the isocyanate group-terminated prepolymer dissolved in organic solvent with an aliphatic diamine chain extender and, where the prepolymer lacks sufficient hydrophilic groups to be self-dispersible, an aliphatic diamine chain extender possessing at least one hydrophilic group to provide an organic solvent solution of self-dispersible polyurethane-urea; and c) adding a sufficient amount of water to the organic solvent solution of the polyurethane-urea to form a dispersion of polyurethane-urea particles.

8. The erasable ink composition of claim 1 wherein the waterborne polyurethane-urea is obtained by the melt dispersion process which comprises:

a) reacting dye monomer which includes structural units of the general formula:

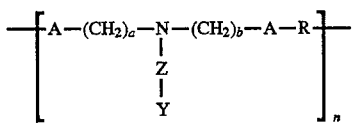

wherein each A independently can be an ester or amide linkage, n can be an integer of from about 1 to about 50, R is an aliphatic or aromatic hydrocarbon with up to about 30 carbon atoms, a and b are independently from 1 to about 10, Z is an unsubstituted arylene group, an arylene group substituted with one or more substituents selected from the group consisting of halogen, hydroxyl, —CHO, alkyl, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is selected from the group consisting of an azo, tricyanovinyl, anthraquinone and methine group, an aliphatic diol possessing at least one ionic group and a diisocyanate to provide an isocyanate group terminated prepolymer possessing ionic groups;

b) reacting the isocyanate group-terminated prepolymer with a formaldehyde-reactive capping agent to cap the isocyanate end groups;

c) dispersing the capped prepolymer in water; and, d) reacting the dispersed capped prepolymer with formaldehyde to provide dispersed polyurethane-urea particles.

9. The erasable ink composition of claim wherein the waterborne polyurethane-urea is obtained by the prepolymer mixing process which comprises:

a) reacting a dye monomer which includes structural units of the general formula:

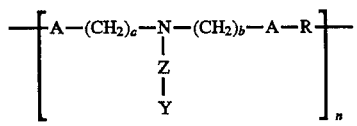

wherein each A independently can be an ester or amide linkage, n can be an integer of from about 1 to about 50, R is an aliphatic or aromatic hydrocarbon with up to about 30 carbon atoms, a and b are independently from 1 to about 10, Z is an unsubstituted arylene group, an arylene group substituted with one or more substituents selected from the group consisting of halogen, hydroxyl, —CHO, alkyl, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is selected from the group consisting of an azo, tricyanovinyl, anthraquinone and methine group, a carboxylic group-containing diol and an aliphatic diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible;

c) dispersing the self-dispersible prepolymer in water; and d) reacting the dispersed prepolymer with a diamine chain extender to provide an aqueous dispersion of polyurethane-urea particles.

10. The erasable ink composition of claim 1 wherein the waterborne polyurethane urea is obtained by the ketamine/ketazine process which comprises:

a) reacting a dye monomer which includes structural units of the general formula:

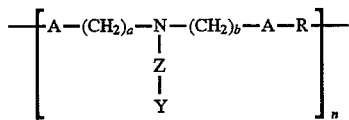

wherein each A independently can be an ester or amide linkage, n can be an integer of from about 1 to about 50, R is an aliphatic or aromatic hydrocarbon with up to about 30 carbon atoms, a and b are independently from 1 to about 10, Z is an unsubstituted arylene group, an arylene group substituted with one or more substituents selected from the group consisting of halogen, hydroxyl, —CHO, alkyl, alkoxy, alkylamino, dialkylamino, amide, alkylamide, —NH$_2$, —NO$_2$, phenyl, carbamyl, —CN, carbalkoxy, sulfonyl, sulfamyl and sulfamido or a single bond when Y is an anthraquinone group and Y is selected from the group consisting of an azo, tricyanovinyl, anthraquinone and methine group, a carboxylic group-containing diol and a diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible; and, c) reacting the self-dispersible prepolymer with at least one member of the group consisting of ketimine and ketazine in the presence of water to provide an aqueous dispersion of polyurethane-urea particles.

11. The erasable ink composition of claim 1 wherein the composition further comprises at least one additional component selected from the group consisting of natural latices, synthetic latices, rheological modifiers, suspension agents, organic solvents, humectants, emulsifiers, surfactants, plasticizers, spreading agents, drying agents, release agents, parting agents, preservatives, antimicrobial agents, anticorrosion agents, antioxidants and coalescing aids.

12. The erasable ink composition of claim 1 possessing a viscosity of at least about 100,000 centipoises.

13. The erasable ink composition of claim 1 possessing a viscosity of at least about 500,000 centipoises.

14. The erasable ink composition of claim 1 possessing a viscosity of from about 1 to about 80,000 centipoises.

15. The erasable ink composition of claim 1 possessing a viscosity of from about 3 to about 30,000 centipoises.

16. A marking instrument containing the erasable ink composition of claim 1.

17. The marking instrument of claim 16 which is a ball-point pen.

* * * * *